United States Patent
Shindo et al.

(10) Patent No.: US 10,259,355 B2
(45) Date of Patent: Apr. 16, 2019

(54) VEHICLE SEAT

(71) Applicants: TACHI-S CO., LTD., Tokyo (JP); HONDA MOTOR CO., LTD., Tokyo (JP)

(72) Inventors: Takashi Shindo, Tokyo (JP); Kengo Kataoka, Tokyo (JP); Makoto Nomura, Tokyo (JP); Kanae Morita, Saitama (JP)

(73) Assignees: TACHI-S CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/535,234

(22) PCT Filed: Nov. 16, 2015

(86) PCT No.: PCT/JP2015/082156
§ 371 (c)(1),
(2) Date: Aug. 15, 2017

(87) PCT Pub. No.: WO2016/093018
PCT Pub. Date: Jun. 16, 2016

(65) Prior Publication Data
US 2017/0355283 A1 Dec. 14, 2017

(30) Foreign Application Priority Data
Dec. 12, 2014 (JP) .................... 2014-251742

(51) Int. Cl.
*B60N 2/28* (2006.01)
*B60N 2/58* (2006.01)
(Continued)

(52) U.S. Cl.
CPC ............ *B60N 2/28* (2013.01); *B60N 2/2806* (2013.01); *B60N 2/2887* (2013.01); *B60N 2/58* (2013.01);
(Continued)

(58) Field of Classification Search
CPC .. B60N 2/42736; B60N 2/4242; B60N 2/002; B60N 2/4279; B60N 2/24; B60N 2/4221; B60N 2/42709
(Continued)

(56) References Cited

U.S. PATENT DOCUMENTS

| 4,555,135 A | * | 11/1985 | Freeland | B60N 2/3086 |
| | | | | 297/105 |
| 6,769,735 B1 | * | 8/2004 | Winkler | B60N 2/3084 |
| | | | | 297/112 |

(Continued)

FOREIGN PATENT DOCUMENTS

| CN | 101181881 A | 5/2008 |
| DE | 102 53 176 A1 | 6/2004 |

(Continued)

OTHER PUBLICATIONS

International Search Report, dated Feb. 9, 2016, for International Application No. PCT/JP2015/082156, 1 page.

(Continued)

*Primary Examiner* — D Glenn Dayoan
*Assistant Examiner* — Sunsurraye Westbrook
(74) *Attorney, Agent, or Firm* — Seed IP Law Group LLP

(57) ABSTRACT

The vehicle seat (100) comprises a cover part (29) including a cover member (24) having a folded portion (24*b*) in the X direction at a position where it is overlapped with a hole part (21*a*) formed in a seat back (2), and a cover member (25) having a folded portion (25*b*) folded in the X direction at a position where it is overlapped with the hole part (21*a*). The (Continued)

cover part (29) includes two sewn parts (26, 27) for fixing the overlapped portion of the cover members (24, 25) in two locations in the Y direction, while no sewn part exists in such section of the overlapped portion as intervenes between the sewn parts (26, 27).

5 Claims, 5 Drawing Sheets

(51) Int. Cl.
  *B60R 22/02* (2006.01)
  *B60R 22/18* (2006.01)
(52) U.S. Cl.
  CPC ...... *B60R 22/02* (2013.01); *B60R 2022/1806* (2013.01)
(58) Field of Classification Search
  USPC ............ 296/68.1, 187.09, 65.16, 187.12, 64, 296/65.17; 297/216.1, 216.13, 216.12, 297/216.16, 284.11, 473, 472; 177/136, 177/144
  See application file for complete search history.

(56) References Cited

U.S. PATENT DOCUMENTS

| | | | |
|---|---|---|---|
| 7,658,431 B2* | 2/2010 | Foussianes | B60N 2/002 296/68.1 |
| 8,303,019 B2* | 11/2012 | Foussianes | B60N 2/002 296/68.1 |
| 2008/0111417 A1 | 5/2008 | Ohta | |
| 2016/0009200 A1* | 1/2016 | Katoh | B60N 2/10 296/68.1 |

FOREIGN PATENT DOCUMENTS

| | | |
|---|---|---|
| JP | 2001-206124 A | 7/2001 |
| JP | 2003-25882 A | 1/2003 |
| JP | 2003-25883 A | 1/2003 |
| JP | 2004-58764 A | 2/2004 |

OTHER PUBLICATIONS

Extended European Search Report, dated Jul. 10, 2018, for European Application No. 15868525.5-1010, 5 pages.
Chinese Office Action, dated Sep. 13, 2018, for Chinese Application No. 201580067508.6, 10 pages. (With English Machine Translation).

* cited by examiner

VEHICLE SEAT

TECHNICAL FIELD

The invention relates to a vehicle seat compatible with child seat installation.

BACKGROUND ART

A vehicle seat includes an ISOFIX type vehicle seat using a child seat fixing method according to ISO (International Standardization Organization) standards. The ISOFIX type vehicle seat includes, in the rear part of a seat cushion, an anchor serving as a fixing member for fixing a child seat.

For example, Patent Document 1 discloses a vehicle seat with an anchor arranged in a hole part formed in a foam-made pad constituting a seat cushion. In this vehicle seat, on the side wall of the foam-made pad which exists on the rear side of the vehicle and is exposed to the hole part, there is provided a cover for covering the side wall. This cover makes it difficult for the foam-made pad exposed into the hole part to be visually perceived from the outside, thereby enabling enhancement in appearance quality.

RELATED ART REFERENCE

Patent Document

Patent Document 1: JP-A-2004-58764

SUMMARY OF THE INVENTION

Problems to be Solved by the Invention

Like the vehicle seat disclosed in Patent Document 1, in a configuration incorporating an anchor in a hole part formed in the seat, the hole part is exposed to the outside, which raises a possibility that refuse and the like can invade into the seat from the hole part.

Also, according to the configuration disclosed in Patent Document 1, although appearance quality can be enhanced, the hole part can be perceived from the outside, thereby leaving room for further improvement in the appearance quality. For example, for enhancement in the appearance quality, a configuration for closing the hole part in some way is conceivable. In this configuration, when an insertion tool of the child seat is inserted into the hole part, how to enhance the insertability is an important task.

The invention is made in view of the above circumstances and thus it is an object of the invention to provide a vehicle seat which, while enhancing appearance quality, can mount a child seat smoothly.

Means for Solving the Problems

A vehicle seat of the invention comprises: a seat back; a seat cushion; a hole part formed in the seat back or in the seat cushion; a fixing member disposed in the hole part for fixing a child seat; and a cover part including: a first cover member having a first folded portion folded at a position overlapped with the hole part; and a second cover member having a second folded portion folded at a position overlapped with the hole part, the first and second folded portions being overlapped with each other, at a position overlapped with the hole part, to cover the hole part as a whole. The cover part includes: two fixing portions for fixing the overlapped portion of the first and second cover members at two locations in a direction along the folded line of the first cover member; a non-folded portion of the first cover member and the first folded portion in such sections of the overlapped portion as exist between the two fixing portions are not fixed; and, a non-folded portion of the second cover member and the second folded portion in such sections of the overlapped portion as exist between the two fixing portions are not fixed.

Advantages of the Invention

According to the invention, it is possible to provide a vehicle seat which, while enhancing appearance quality, can mount a child seat smoothly.

MODES FOR CARRYING OUT THE INVENTION

Description is given below of an embodiment of the invention with reference to the drawings.

Figure 1:
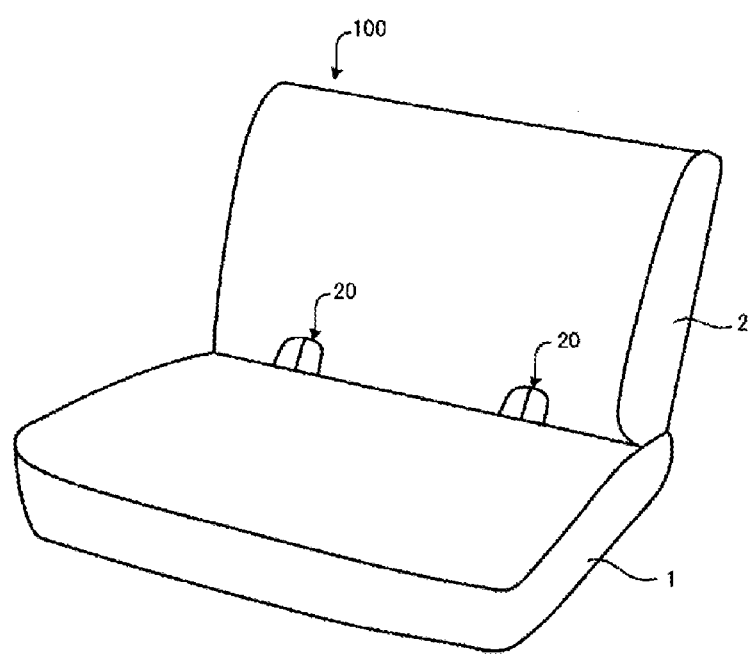
FIG. 1 is an external view of the schematic configuration of a vehicle seat represented by a car seat, explaining an embodiment according to the invention.

FIG. 1 is an external view of the schematic configuration of a vehicle seat represented by a car seat, explaining an embodiment according to the invention.

A vehicle seat 100 shown in FIG. 1 includes a seat cushion 1 and a seat back 2.

In such portion of the seat back 2 as exists near to the connecting portion thereof with the seat cushion 1, there are arranged side by side two ISOFIX compatible units 20 for fixing an ISOFIX compatible type child seat to the vehicle seat 100.

Figure 2:
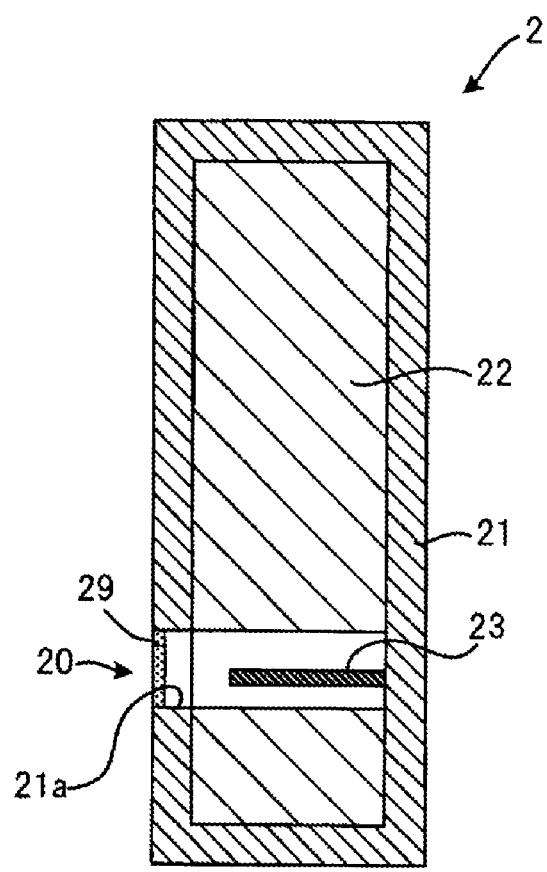
FIG. 2 is a schematic cross-section view of a seat back shown in FIG. 1.

FIG. 2 is a schematic cross-section view of the seat back 2 shown in FIG. 1.

The seat back 2 includes a foam-made pad 22 supported by a support member fixed to a frame (not shown), a trim cover 21 for covering the pad 22, and an ISOFIX compatible unit 20.

The ISOFIX compatible unit 20 includes a hole part 21a formed in the trim cover 21 and pad 22 so as to extend from the front side of a vehicle, on which the vehicle seat 100 is to be mounted, to the rear side thereof, a cover part 29 for covering the hole part 21a, and an anchor 23 provided within the hole part 21a.

The anchor 23 is a fixing member for fixing a child seat to the seat back 2. The anchor 23 is configured by, for example, a U-shaped wire with two free ends thereof welded to the frame of the seat back 2. An insertion tool of the child seat is locked to the wire, whereby the child seat is fixed to the seat back 2.

Figure 3:
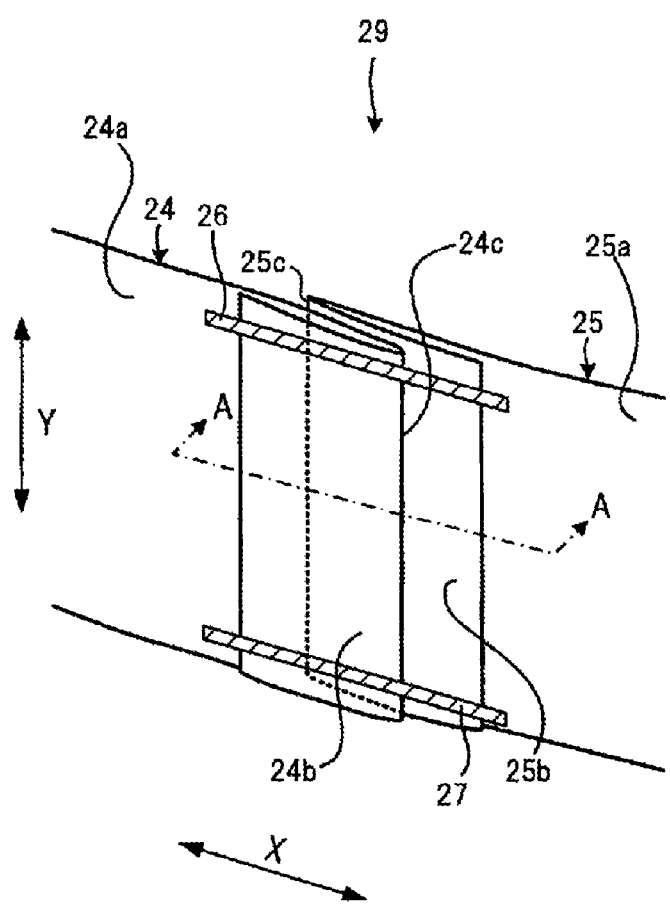
FIG. 3 is an enlarged perspective view of a cover part 29 of an ISOFIX compatible unit 20 shown in FIG. 2.
Figure 4:
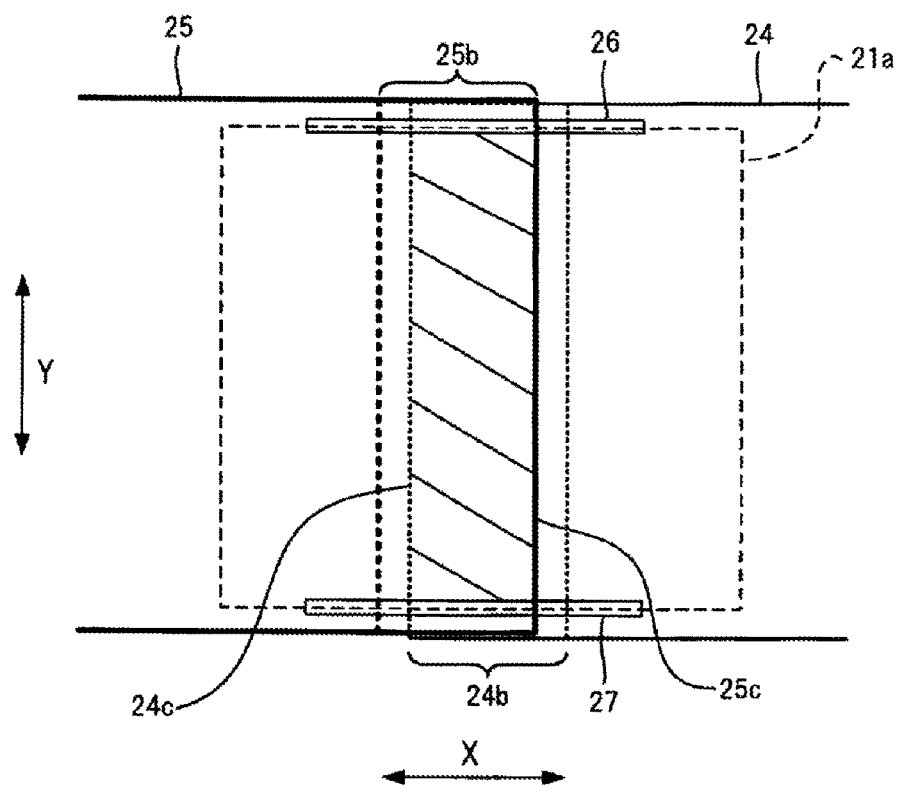
FIG. 4 is a view of the cover part 29 when viewed from front of the seat back 2.

FIG. 3 is an enlarged perspective view of the cover part 29 of the ISOFIX compatible unit 20 shown in FIG. 2, showing a state where the cover part 29 is viewed from the hole part 21a side. FIG. 4 is a view of the cover part 29 when viewed from front of the seat back 2.

The cover part 29 includes cover members 24 and 25 arranged in the X direction parallel to the seat surface of the seat cushion 1, while they are partially overlapped with each other.

The cover member 24, in the example shown in FIGS. 3 and 4, is formed such that whole shape thereof is a rectangular shape long in the X direction. The cover member 24 is constituted of a folded portion 24b folded in one direction of the X direction at a position where it overlaps with the hold part 21a, and a non-folded portion 24a which is a portion other than the folded portion 24b.

The folded portion 24b is a portion which is folded toward the hole part 21a in such a manner that the non-folded portion 24a comes to the front of the seat back 2.

Reference numeral 24c shown in FIGS. 3 and 4 designates a boundary (the folded line of the cover member 24) between the folded portion 24b and non-folded portion 24a. The boundary 24c is a straight line parallel to the Y direction orthogonal to the X direction.

The cover member 25, in an example shown in FIGS. 3 and 4, is formed such that whole shape thereof is a rectangular shape long in the X direction. The cover member 25 is constituted of a folded portion 25b folded in the other direction of the X direction at a position where it overlaps with the hold part 21a, and a non-folded portion 25a other than the folded portion 25b.

The folded portion 25b is a portion which is folded toward the hole part 21a in such a manner that the non-folded portion 25a comes to the front of the seat back 2. Reference numeral 25c shown in FIGS. 3 and 4 designates a boundary (the folded line of the cover member 25) between the folded portion 25b and non-folded portion 25a. The boundary 25c is a straight line parallel to the Y direction.

The cover members 24 and 25 are overlapped with each other such that the folded portions 24b and 25b are overlapped with each other at a position where they are overlapped with the hole part 21a.

The cover members 24 and 25 are fixed in the one-side ends thereof in the Y direction extending along the boundary 24c by a sewn part 26 extending in the X direction. The sewn part 26 is formed at least in the overlapped portion of the cover members 24 and 25. That is, the cover members 24 and 25 are fixed at least in their mutual overlapped portions by the sewn part 26. The sewn part 26 means a part where multiple materials are sewn together by sewing.

The cover members 24 and 25 are fixed in the other-side ends thereof in the Y direction extending along the boundary 24c by a sewn part 27 extending in the X direction. The sewn part 27 is formed at least in the overlapped portion of the cover members 24 and 25. That is, the cover members 24 and 25 are fixed at least in their mutual overlapped portions by the sewn part 27 as well. The sewn part 27 means a part where multiple materials are sewn together by sewing.

The peripheral edge part of the cover member 24 except for the boundary 24c and the peripheral edge part of the cover member 25 except for the boundary 25c are fixed to the trim cover 21 of the seat back 2 by sewing. The sewn parts 26 and 27 may also be used in common when the cover members 24 and 25 are sewn to the trim cover 21.

The sewn parts 26 and 27 may also be constituted of any other parts so long as they can fix the cover members 24 and 25. For example, instead of sewing, the two members may be fixed by adhesive or the like. The sewn parts 26 and 27 function as fixing parts stated in the scope of the patent claims.

Such portion of the cover part 29 as intervenes between the sewn parts 26 and 27 is depressed toward the inside of the hole part 21a when a force is applied thereto from the outside of the seat back 2. Therefore, by inserting the insertion tool of the child seat from this portion down to the deep portion of the hole part 21a, the insertion tool can be mounted onto the anchor 23.

With respect to the length of such portion of the cover part 29 as intervenes between the sewn parts 26 and 27, there may be secured a value which is sufficient for insertion of the insertion tool of the child seat, while such portion may be formed in two locations extending at a proper interval along the boundary 24c in the Y direction.

Also, the cover members 24 and 25 may preferably be formed of such material that, after the insertion tool is taken out from the intervening portion of the cover part 29 between the sewn parts 26 and 27, enables easy restoration of the cover part 29 to the original shape. For example, a material containing urethane can be used.

In the cover part 29, of the overlapped portion of the cover members 24 and 25 (a portion between the two boundaries 24c and 25c in FIG. 4), in a portion intervening between the sewn parts 26 and 27 (a portion shaded in FIG. 4), there exists no sewn part.

Absence of the sewn part in this portion means that any one of the four composing elements (the non-folded portion 24a, folded portion 24b, non-folded portion 25a and folded portion 25b) shown in the shaded portion of FIG. 4 can move independently.

For example, supposing a configuration in which, in the shaded portion of FIG. 4, the non-folded portion 24a and folded portion 24b are fixed by sewing or by adhesion. In this configuration, when the insertion tool of the child seat is inserted into the hole part 21a, the non-folded portion 24a and folded portion 24b move integrally. This increases the rigidity of the movable part of the cover member 24.

Also, supposing a configuration in which, in the shaded portion of FIG. 4, the non-folded portion 25a and folded portion 25b are fixed by sewing or by adhesion. In this configuration, when the insertion tool of the child seat is inserted into the hole part 21a, the non-folded portion 25a and folded portion 25b move integrally. This increases the rigidity of the movable part of the cover member 25.

It is known that, when the rigidity of the movable portion of the cover part 29 capable of moving toward the hole part 21a is increased, depending on the kind of a child seat, the insertion tool catches on the cover part 29, thereby lowering insertability. For example, some of the insertion tools of child seats according to the standards (L-NCAP, E-NCAP) of specific countries, can lower insertability.

With the cover part 29 of the vehicle seat 100, in the shaded portion of FIG. 4, the non-folded portion 24a and folded portion 24b are not fixed by sewing or by adhesion. Also, in the shaded portion of FIG. 4, the non-folded portion 25a and folded portion 25b are not fixed by sewing or by adhesion. Therefore, the rigidity of the movable portion of the cover part 29 capable of moving toward the hole part 21a can be lowered. When the rigidity of the movable portion is lowered, the insertability of the insertion tool can be enhanced with respect to a child seat according to the standards of each country.

Also, in the cover part 29, the non-folded portion 24a and folded portion 24b are fixed only by the two sewn parts 26 and 27, while the non-folded portion 25a and folded portion 25b are fixed only by the two sewn parts 26 and 27. This can minimize the number of sewn parts, thereby enabling reduction of cost necessary for sewing. Also when fixation is done by adhesion instead of by sewing, the cost necessary for adhesion can be reduced.

Also, since the cover part 29 covers the hole part 21a, there can be provided an effect that the insertability of the insertion tool can be enhanced without deteriorating the appearance quality of the seat back 2.

Figure 5:
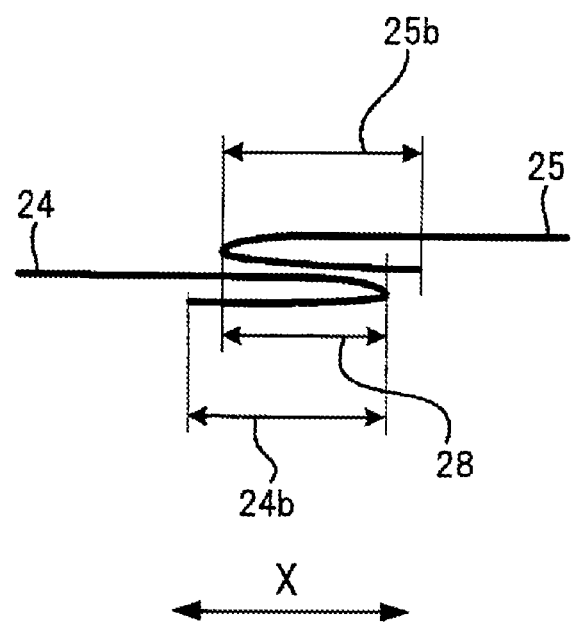
FIG. 5 is a schematic cross-section view along the A-A line of FIG. 3.

FIG. 5 is a schematic cross-sectional view along the A-A line of FIG. 3.

As shown in FIG. 5, the length of the folded portion 24b in the folded direction (X direction) is longer than the length of the overlapped portion 28 of the cover members 24 and 25 in the X direction.

Also, the length of the folded portion 25b in the folded direction (X direction) is longer than the length of the overlapped portion 28 of the cover members 24 and 25 in the X direction.

According to this configuration, in the process of taking out the insertion tool of the child seat from the hole part 21a, there can be reduced a possibility that the insertion tool can catch on the tip ends of the folded portions 24b and 25b. Also, the rigidity of the cover members 24 and 25 can be prevented from being lowered excessively. This enables smooth insertion and take-out of the insertion tool of the child seat. Also, the rolling-up of the folded portions 24b and 25b near to the boundaries 24c and 25c due to the restoring forces of the cover members 24 and 25 can be suppressed. Thus, the appearance quality can be enhanced and the catch of the insertion tool in the take-out process can be prevented.

Also, when the stability of the movements of the cover members 24 and 25 is taken into consideration, in some cases, preferably, the non-folded portion 24a and folded portion 24b may be fixed further by sewing or by adhesion, and the non-folded portion 25a and folded portion 25b may be fixed further by sewing or by adhesion.

In this case as well, since the lengths of the folded portions 24b and 25b are longer than the overlapped portion 28, in the other portion than the overlapped portion 28, the non-folded portion 24a and folded portion 24b can be fixed by sewing or by adhesion, and the non-folded portion 25a and folded portion 25b can be fixed by sewing or by adhesion.

Consequently, also in a configuration in which the non-folded portion 24a and folded portion 24b are fixed by other sewn parts than the sewn parts 26 and 27, the sewn parts can be set at positions sufficiently distant from the boundary 24c. And, also in a configuration in which the non-folded portion 25a and folded portion 25b are fixed by other sewn parts than the sewn parts 26 and 27, the sewn parts can be set at positions sufficiently distant from the boundary 25c. Thus, these sewn parts do not deteriorate the insertability of the insertion tool but the cover members 24 and 25 can be moved more smoothly.

Here, in consideration of smooth insertion and take-out of the insertion tool of the child seat, the length of the overlapping portion 28 in the X direction may preferably be set around 5 mm.

Also, since the excessively large area of the cover member 24 causes a cost increase factor, the upper limit value of the length of the folded portion 24b in the X direction may preferably be set four times the length of the overlapped portion 28 in the X direction. Also, the lower limit value of the length of the folded portion 24b in the X direction, in consideration of insertability enhancement in the insertion tool, may preferably be set two times the length of the overlapped portion 28 in the X direction.

Similarly, the length of the folded portion 25b in the X direction may also preferably be set to two times or more and 4 times or less the length of the overlapped portion 28 in the X direction.

The cover part 29 may also have a configuration in which the length of the folded portion 24b in the X direction is smaller than the length of the overlapped portion 28 in the X direction, or a configuration in which the length of the folded portion 25b in the X direction is smaller than the length of the overlapped portion 28 in the X direction. Even these configurations, due to absence of a sewn part in the overlapped portion 28, also can provide an effect that the insertability of the insertion tool of the child seat can be enhanced.

In the foregoing description, there is employed the configuration in which the cover members 24 and 25 are overlapped with each other in the X direction parallel to the seat surface of the seat cushion 1. However, there may also be employed a configuration in which the cover members 24 and 25 are overlapped with each other in the Y direction perpendicular to the seat surface of the seat cushion 1, or a configuration in which the cover members 24 and 25 are overlapped with each other in a direction orthogonal to the Y direction perpendicular to the seat surface of the seat cushion 1.

Also, there may be employed a configuration in which the ISOFIX compatible unit 20 is provided on the seat cushion 1 not in the seat back 2.

As has been described heretofore, in this specification, the following matters are disclosed.

The vehicle seat disclosed herein comprises: a seat back; a seat cushion; a hole part formed in the seat back or in the seat cushion; a fixing member disposed in the hole part for fixing a child seat; and, a cover part including a first cover member having a first folded portion folded at a position overlapped with the hole part and a second cover member having a second folded portion folded at a position overlapped with the hole part, while the cover part, with the first and second folded portions overlapped with each other at a position overlapped with the hole part, as a whole, covers the hole part. The cover part includes two fixing portions for fixing the overlapped portion of the first and second cover members at two locations in a direction along the folded line of the first cover member, a non-folded portion of the first cover member and the first folded portion in such sections of the overlapped portion as exist between the two fixing portions are not fixed, and a non-folded portion of the second cover member and the second folded portion in such sections of the overlapped portion as exist between the two fixing portions are not fixed.

In the vehicle seat disclosed herein, the length of the first folded portion in its folded direction is larger than the length of the overlapped portion in this folded direction, and the length of the second folded portion in its folded direction is larger than the length of the overlapped portion in this folded direction.

In the vehicle seat disclosed herein, a non-folded portion of the first cover member and the first folded portion except for the two fixing portions are not fixed, and a non-folded portion of the second cover member and the second folded portion except for the two fixing portions are not fixed.

In the vehicle seat disclosed herein, the length of the first folded direction in its folded direction is two times or more and four times or less the length of the overlapped portion in the folded direction, and the length of the second folded direction in its folded direction is two times or more and four times or less the length of the overlapped portion in this folded direction.

INDUSTRIAL APPLICABILITY

According to the vehicle seat of the invention, while enhancing appearance quality, a child seat can be mounted smoothly.

While the invention has been described heretofore with reference to a specific embodiment, the invention is not limited to the embodiment but it can be changed variously within a range not departing from the technical concept of the invention disclosed herein.

The present application is based on the Japanese Patent Application No. 2014-251742 filed on Dec. 12, 2014 and thus the contents thereof are incorporated herein for reference.

DESCRIPTION OF REFERENCE NUMERALS AND SIGNS

100: Vehicle sheet
1: Seat cushion
2: Seat back
21a: Hole part
23: Anchor
24, 25: Cover member
24b, 25b: Folded portion
26, 27: Sewn part
29: Cover part

The invention claimed is:

1. A vehicle seat, comprising:
a seat back;
a seat cushion;
a hole part formed in the seat back or in the seat cushion;
a fixing member, disposed in the hole part, configured to fix a child seat; and
a cover part including: a first cover member having a first folded portion folded at a position overlapped with the hole part; and a second cover member having a second folded portion folded at a position overlapped with the hole part, the first folded portion and the second folded portion being overlapped with each other, at a position overlapped with the hole part, to cover the hole part as a whole, wherein:
the cover part includes: a first fixing portion configured to fix the overlapped portion of the first cover member and the second cover member at a first location; and a second fixing portion configured to fix the overlapped portion of the first cover member and the second cover member at a second location spaced apart from the first location in a direction along the folded line of the first cover member;
a non-folded portion of the first cover member and the first folded portion, in such sections of the overlapped portion as exist between the first fixing portion and the second fixing portion, are not fixed; and
a non-folded portion of the second cover member and the second folded portion, in such sections of the overlapped portion as exist between the first fixing portion and the second fixing portion, are not fixed.

2. A vehicle seat according to claim 1, wherein:
the length of the first folded portion in its folded direction is larger than the length of the overlapped portion in this folded direction; and
the length of the second folded portion in its folded direction is larger than the length of the overlapped portion in this folded direction.

3. A vehicle seat according to claim 2, wherein
a non-folded portion of the first cover member and the first folded portion except for the first fixing portion and the second fixing portion are not fixed, and a non-folded portion of the second cover member and the second folded portion except for the first fixing portion and the second fixing portion are not fixed.

4. A vehicle seat according to claim 2, wherein:
the length of the first folded direction in its folded direction is two times or more and four times or less the length of the overlapped portion in this folded direction; and
the length of the second folded direction in its folded direction is two times or more and four times or less the length of the overlapped portion in this folded direction.

5. A vehicle seat according to claim 3, wherein:
the length of the first folded direction in its folded direction is two times or more and four times or less the length of the overlapped portion in this folded direction; and
the length of the second folded direction in its folded direction is two times or more and four times or less the length of the overlapped portion in this folded direction.

* * * * *